Figure 6:
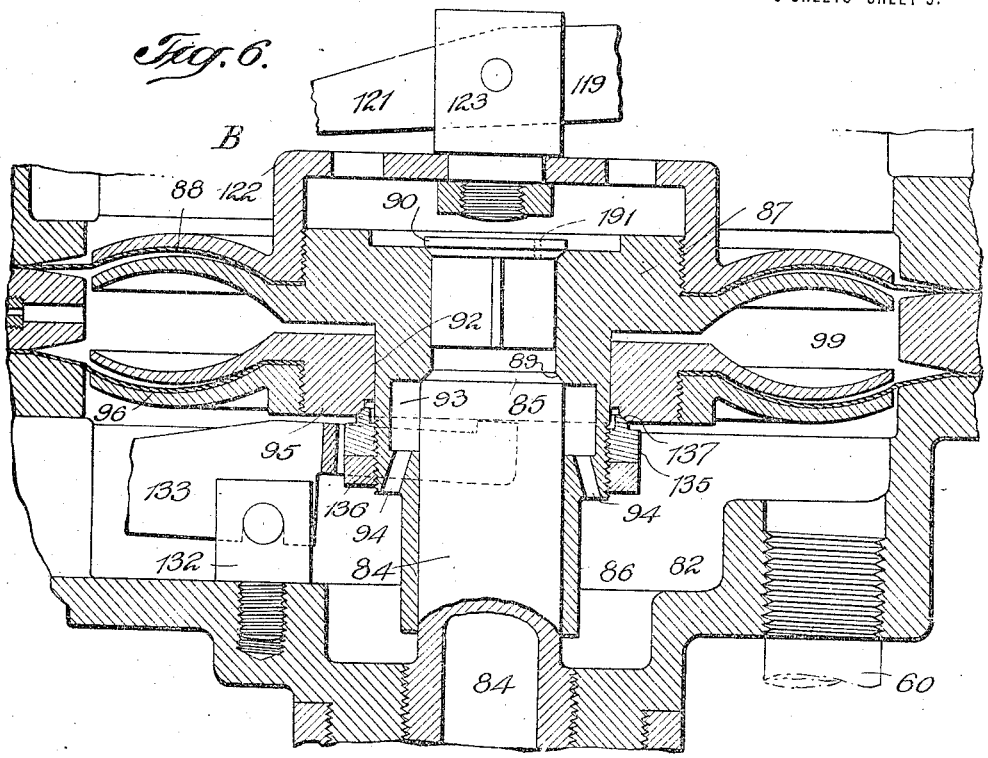

S. G. NEAL.
AIR BRAKE APPARATUS.
APPLICATION FILED JUNE 5, 1917. RENEWED MAR. 20, 1919.
1,326,211.
Patented Dec. 30, 1919.
5 SHEETS—SHEET 1.
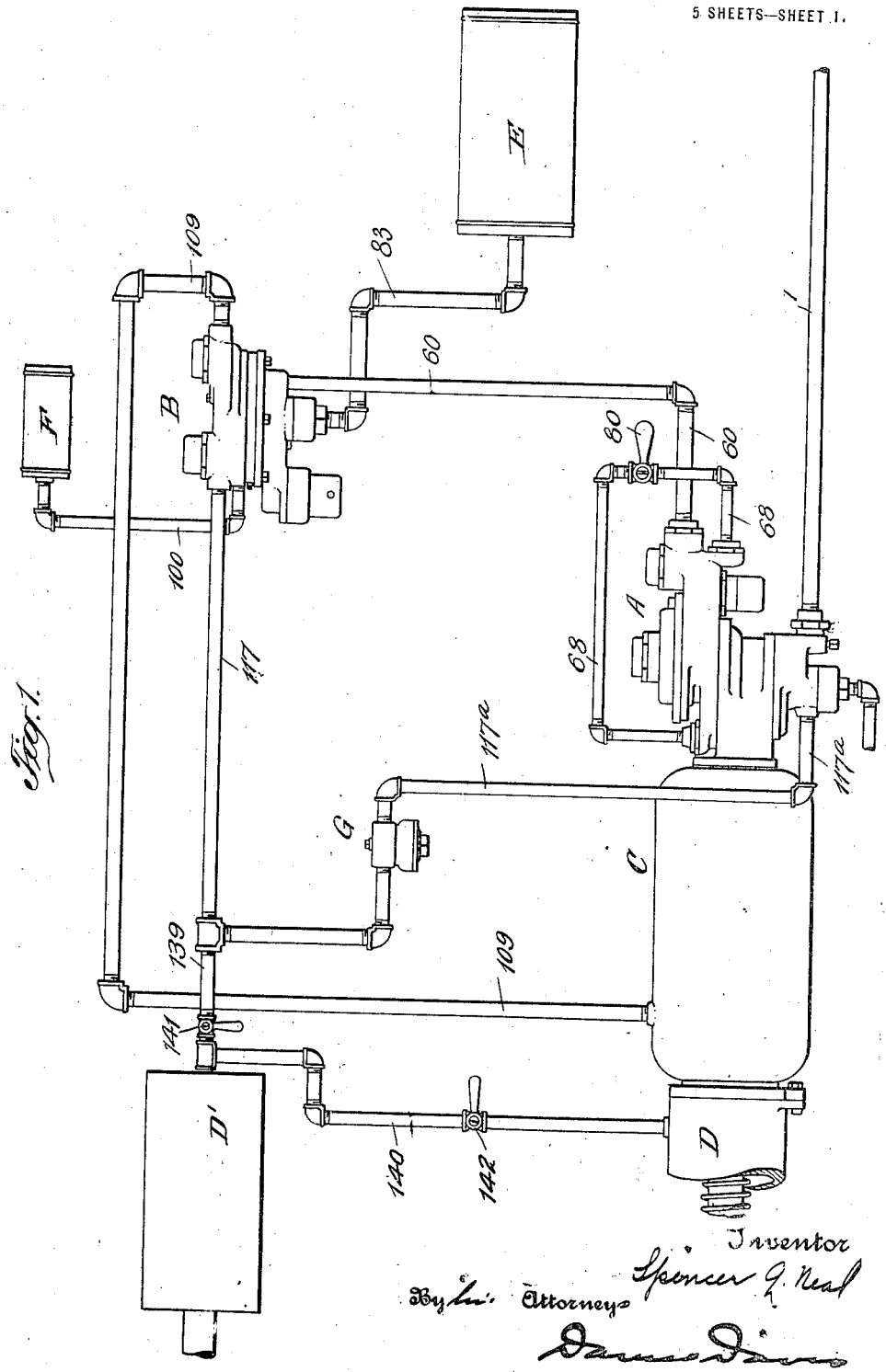

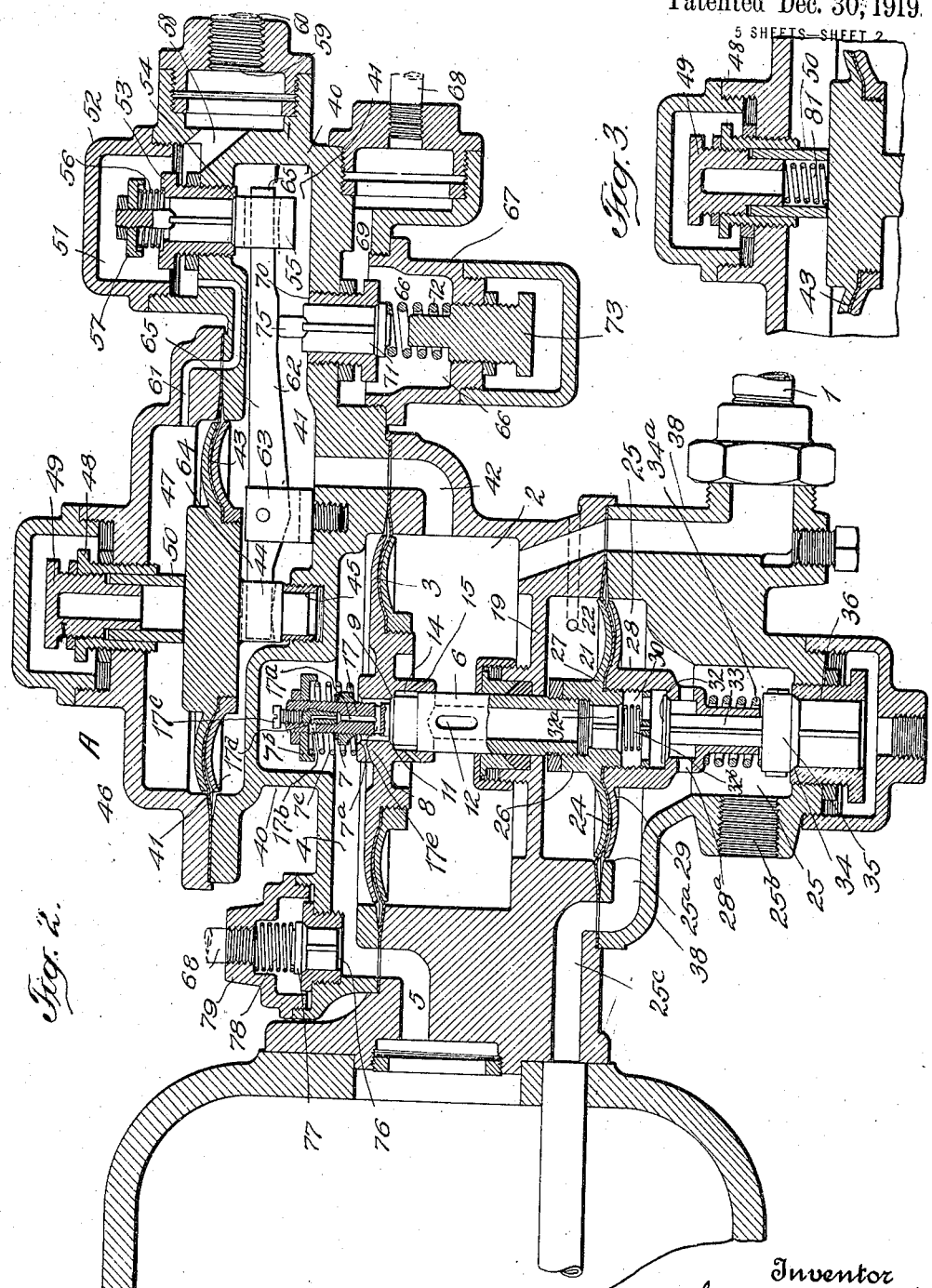

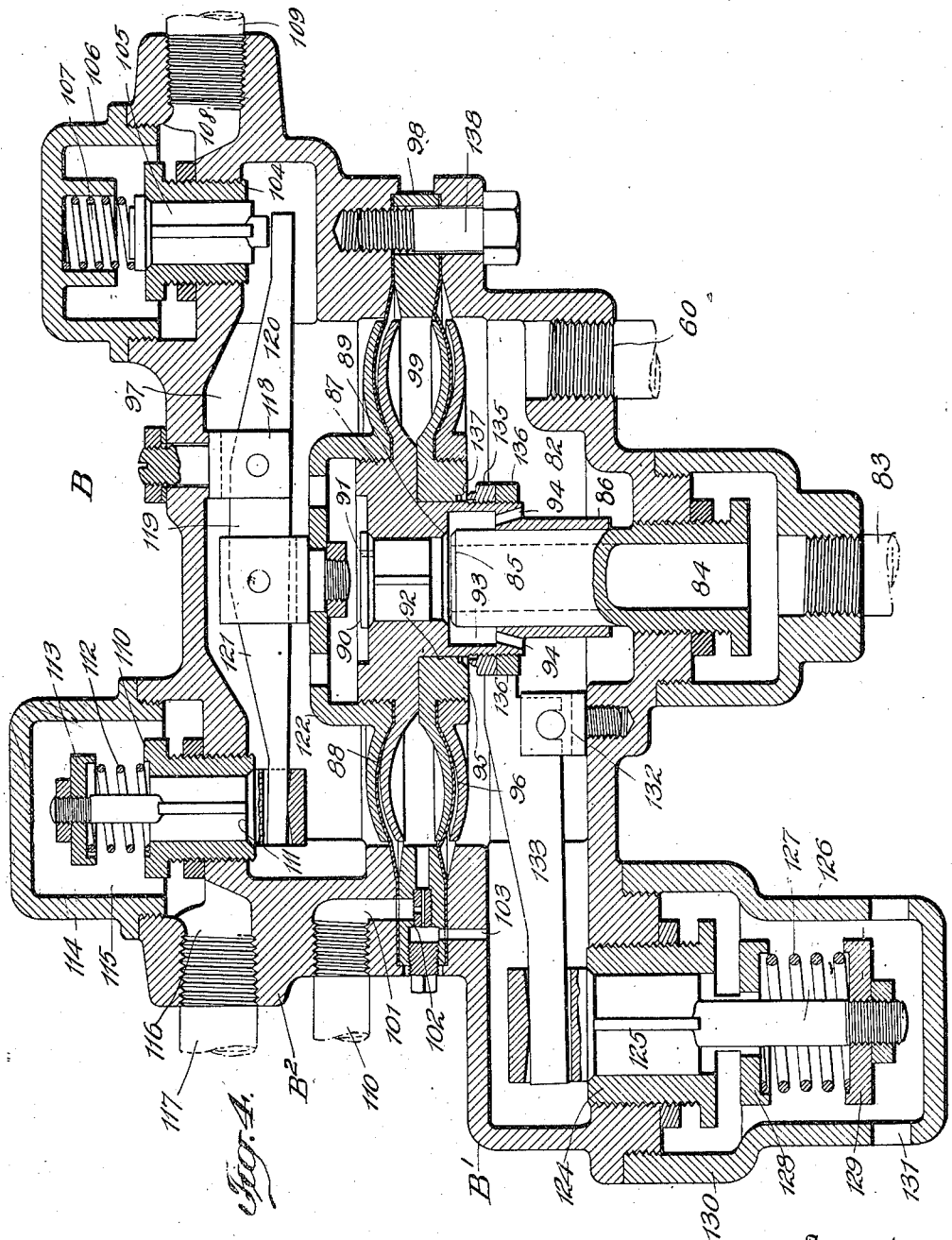

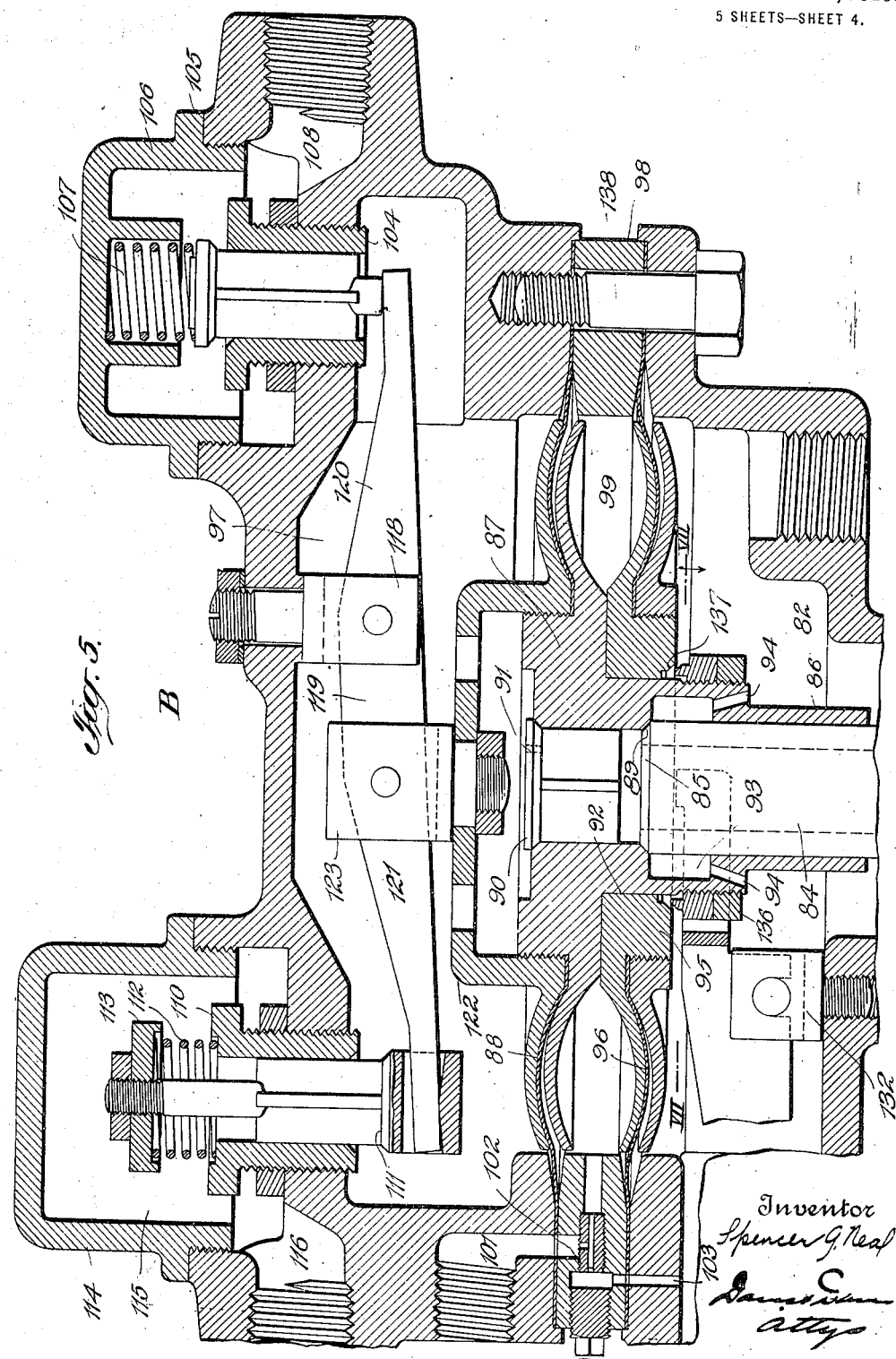

S. G. NEAL.
AIR BRAKE APPARATUS.
APPLICATION FILED JUNE 5, 1917. RENEWED MAR. 20, 1919.

1,326,211.

Patented Dec. 30, 1919.

Inventor
Spencer G. Neal
By his Attorneys

UNITED STATES PATENT OFFICE.

SPENCER G. NEAL, OF NEW YORK, N. Y., ASSIGNOR, BY MESNE ASSIGNMENTS, TO AUTOMATIC STRAIGHT AIR-BRAKE COMPANY, OF WILMINGTON, DELAWARE, A CORPORATION OF DELAWARE.

AIR-BRAKE APPARATUS.

1,326,211.   Specification of Letters Patent.   Patented Dec. 30, 1919.

Application filed June 5, 1917, Serial No. 172,922. Renewed March 20, 1919. Serial No. 283,836.

*To all whom it may concern:*

Be it known that I, SPENCER G. NEAL, a citizen of the United States, and resident of the borough of Manhattan, city, county, and State of New York, have invented certain new and useful Improvements in Air-Brake Apparatus, of which the following is a specification.

This invention relates more particularly to improvements in that type of air brake apparatus illustrated in Patent No. 1,183,103, dated May 16, 1916, and in my application for patent filed November 17, 1916, and serially numbered 131,818.

One of the important objects of this invention is to provide simplified means whereby upon a sudden reduction of train pipe pressure to secure an emergency application of the brakes the train pipe will be vented to atmosphere at each triple valve. By providing means whereby the train pipe will be vented to atmosphere at each triple valve and for each braking unit, the train pipe reduction will be secured throughout the train with great rapidity, causing the almost simultaneous operation of all of the triple valves without regard to the length of the train.

Another object of the invention is to provide simplified means whereby upon an emergency application of the brakes the train pipe reservoir will be so connected to the train line that if the pressure therein is greater than the pressure resulting from the equalization of the emergency reservoir into the brake cylinder, the train pipe reservoir pressure will be added to the said equalized pressure. If, however, the train pipe reservoir pressure is not greater than the equalized emergency reservoir pressure and brake cylinder pressure, the said train pipe reservoir will be sealed from the train pipe and from the brake cylinder. During the ordinary service applications of the brakes the train pipe reservoir is in communication with the train pipe for the purpose of augmenting the train pipe volume, as described in the patent and application for patent mentioned herein.

Another object of the invention is to provide means in the service section of the triple valve and operating upon an increase of train pipe pressure, to place the emergency reservoir in communication with the train pipe for a quick-release of the brakes.

A further object of the invention is to provide the emergency section of the triple valve with means operating upon a sudden reduction of train pipe pressure to place the emergency reservoir in communication with the brake cylinder; to seal the train pipe reservoir from the train pipe; to permit the train pipe reservoir air to flow into the brake cylinder if the said reservoir pressure exceeds the brake cylinder pressure upon an emergency application of the brakes, and further to provide means whereby after the equalization of emergency reservoir pressure into the brake cylinder the said equalized pressure may flow slowly into the train pipe reservoir if said equalized pressure is greater than the pressure in said main pipe reservoir.

There are many other important objects and advantages of the invention, resulting from the novel construction and arrangement of the apparatus described herein, all of which will more fully appear hereinafter.

In the drawings, Figure 1 is a diagrammatic view of a braking unit embodying the invention;

Fig. 2 a central vertical sectional view of the service section of the triple valve;

Fig. 3 a detail sectional view of a portion of the quick-release feature of the service section of the triple;

Fig. 4 a vertical central sectional view of the emergency and change-over section of the triple;

Fig. 5 a similar view on a larger scale, of a portion of the apparatus shown in Fig. 4, with some of the parts in emergency position;

Fig. 6 a similar view showing the parts in complete emergency position; and

Figure 7:
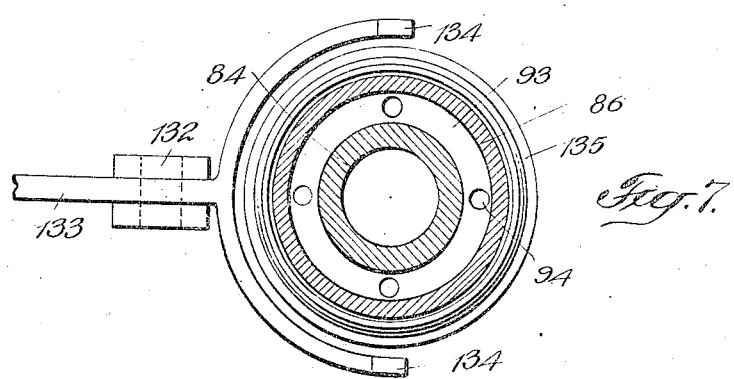

Fig. 7 a detail horizontal sectional view on the line VII—VII of Fig. 5.

Referring to the various parts by reference characters, A designates the quick-release and service section of the triple valve; B the emergency and change-over section; C the emergency reservoir; D the service-brake cylinder; D¹ the auxiliary brake cylinder; E the train pipe reservoir; F the quick-action reservoir, and G a check valve.

As illustrated in the drawings, the section A of the triple contains the parts by which the service applications of the brakes are secured and through which the release of the brakes is obtained, and also through which the apparatus is charged. This section also contains the parts by means of which the quick-release of the brakes is secured by an increase of train pipe pressure. Section B of the triple valve contains the parts which control the emergency applications of the brakes, and those parts which seal the train pipe reservoir from the train pipe and connect it to the brake cylinder upon an emergency application of the brakes, and also the devices by means of which the train pipe reservoir will be sealed from the brake cylinder except for a small leak port whenever the brake cylinder pressure equals or exceeds the pressure in the train pipe reservoir.

The parts in the service section A of the triple valve for controlling the charging of the apparatus and securing service applications of the brakes and the graduated release of the brakes, are constructed almost precisely as shown in the Patent No. 1,183,103 and my application Serial No. 131,818, and operate as described in said patent and in said application. For this reason it is thought unnecessary to minutely and particularly describe herein every part of section A of the triple valve, and its operation. Section B of the triple, however, is modified considerably and this part of the apparatus will be fully described both as to structure and operation.

The train pipe 1 leads into the main train pipe chamber 2, said chamber being in section A of the valve. Above said chamber 2 and separated therefrom by the main abutment or diaphragm 3, is an emergency reservoir chamber 4 in constant communication with the emergency reservoir through passage 5. In order that said abutment 3 may operate valves hereinafter described, the same is made to coöperate with a hollow upright valve stem 6 provided with a reduced upper end. The main diaphragm 3 carries a sliding head 8 which has a working fit around the stem 6 and is provided with a downwardly facing valve seat 9, which coöperates with the charging valve 11, this latter valve being a part of upright rod or stem 6. Said valve stem 6 forms a guide for the sliding head 8, so that the air pressure upon the diaphragm 3 may be utilized to positively open and close said valve 11.

Referring more in detail to the construction and operation of the valve device within the head 8, the hollow rod 6 is open at its lower end, but the bore in said rod terminates at a point a little below the valve 11, as indicated by dotted lines in Fig. 2. Air is admitted through inlets 12 into the upper portion of the bore of said rod 6. A plurality of ports 15 lead through the wall of the head 8 to admit air to a clearance 14. The upper portion of hollow rod 6 is provided with a somewhat reduced portion which forms the valve 11 already referred to.

Above said valve 11 the stem is provided with a more reduced portion 17, the clearance around which will conduct the air to chamber 4 from around the hollow rod 6 when the valve 11 is opened.

Secured to the reduced portion 17 of the stem 6 above the abutment 3, is a downwardly tapered valve 7 which is adapted to fit a corresponding seat $7^a$ in the top of the head 8 of the abutment 3. The valve 7 is so placed on the stem 17 that when valve 11 is seated valve 7 will be a considerable distance above seat $7^a$. Valve 7 is locked in its adjusted position by a suitable lock nut, as shown in Fig. 2. On the upper end of the stem 17 is a disk $7^b$, between which and the upper surface of the sliding head 8 is confined a coil spring $7^c$. This spring exerts a force tending to bring valve 11 to its seat 9. The disk $7^b$ is locked on the stem 17 by means of a suitable lock nut, and, of course, may be adjusted in order to cause the spring $7^c$ to exert the desired pressure on the abutment 3. There is a considerable clearance between the sliding head 8 of the abutment or diaphragm 3, and the stem 17, so that when the head is between the valves 7 and 11 there will be an air passage of considerable capacity through the abutment.

The stem 17 is bored axially as at $17^a$, from its upper end to the transverse port $17^e$, a port $17^b$ connecting the said bore with chamber 4. A governing screw $17^c$ is threaded into the end of the bore $17^a$, said screw being centrally apertured from its inner end to a transverse port $17^d$, (see Fig. 2) this latter port communicating with the port $17^b$. The port $17^e$ opens into an annular groove in part 17, between the valve seats $7^a$ and 9.

Upon a reduction of train pipe pressure in chamber 2 for the purpose of securing a service application of the brakes, abutment 3 is moved downwardly by the superior pressure in chamber 4, and valve 11 seated on the valve seat 9, thereby closing communication between the chambers 2 and 4. Upon an increase of pressure in train pipe chamber 2 for the purpose of securing a release of the brakes, the excessive pressure in chamber 2 will force the abutment 3 upwardly against the tension of the spring $7^c$ and valve 7 will be seated on valve seat $7^a$. During the period of excessive pressure in the chamber 2 air will slowly pass valve 11 and through $17^a$, $17^b$, into chamber 4. When the pressure in chamber 2 is again reduced to normal the spring $7^c$ will, combined with the pressure in chamber 4, move abutment 3 downwardly to bring valve 11 to valve seat 9.

In originally charging the apparatus if the rise of train pipe pressure is rapid, air will pass from chamber 2 around valve 11, slowly through bore $17^a$ and port $17^b$ to chamber 4 and to emergency reservoir. If the rise of pressure in the train pipe and in chamber 2 is slow, air will pass rapidly and in considerable quantities around valve 11, through the clearance between the head 8 and the stem 17, around valve 7, into chamber 4, and at the same time air will pass through the bore 17$^a$ and port 17$^b$. This will provide a very quick charge of the chamber 4 and emergency reservoir.

It is only when there is a considerable excess pressure in chamber 2 that the valve 7 will be seated and the slow charge will take place through the ports in the stem 17 and screw 17$^c$.

Beneath the train pipe chamber 2 and separated therefrom by a cross wall 19 is a chamber 21. An equalizing abutment 24 extends across the lower side of the chamber 21 to separate said chamber from an equalizing chamber 25. Chamber 21 is vented to atmosphere through port 22. In the embodiment of the invention illustrated in the drawings, the main abutment 3 has about twice the area of the equalizing abutment 24. Therefore, the reduction of train pipe pressure ten pounds will cause approximately twenty pounds pressure to be built up in the brake cylinder and in the equalizing chamber 25 before there will be enough pressure beneath said equalizing abutment to lift the rod 6 and close valve 32, all of which is clearly set out in my Patent No. 1,082,758, dated December 30, 1913. Hollow rod 6 at its lower end screws into a hub 26 formed on the upper side of flange 27 of the equalizing abutment 24. A nut locks the hub to the stem and said nut is adapted to engage the under side of the cross wall 19 to limit the upward movement of the rod. The flange 27 is formed with a central depending hollow stem which screws into the upper end of a valve cage 28, said valve cage carrying the lower abutment flange 29 for the abutment 24. The said valve cage and rod afford communication between the equalizing chamber 25 and the train pipe chamber 2. The valve cage 28 forms a small chamber 30, the outlet of which is controlled by the valve 32 seating downwardly and having a downwardly extending stem 33 carrying at its lower end an exhaust valve 35 which opens and closes a vent 36. The lower end of the stem 33 is loosely connected to the valve 35 whereby said valve will be free to seat squarely and truly on the valve seat 34. The valve cage 28 is also provided with passages 28$^a$ below valve 32. Equalizing chamber 25 is formed by casing 38 upon the lower end of which is screwed a protecting cap. Chamber 25 is in direct communication with the brake cylinder through port 25$^a$ and passage 25$^c$.

A valve 32$^a$ is held to its seat by means of a spring 32$^b$, the lower end of said spring being seated in a spider arm within the chamber 30, said arm being spaced sufficiently far above the valve 32 to permit it to have a free opening movement. Valve 32$^a$ prevents air passing back to the train pipe chamber 2 during an emergency application of the brakes when the brake cylinder pressure exceeds train pipe pressure, all of which is fully set out in my aforesaid application for patent. Valve 35 is held yieldingly to its seat by spring 34$^a$ which is placed between the lower end of the valve cage 28 and the upper surface of valve 35.

Secured to the top of the main body portion of the service section of the triple is a supplemental body part 40, said supplemental body part forming the upper wall of the emergency reservoir chamber 4 and containing the supplemental train pipe chamber 41, said chamber being connected to the main train pipe chamber 2 through a passage 42. A vertically movable quick-release diaphragm 43 forms the upper wall of the supplemental train pipe chamber 41, said diaphragm carrying a central depending stem 44 which is guided at its lower end in a vertically adjustable tubular stop 45. The diaphragm 43 is secured in position by a cap plate 46 which forms a chamber 47 directly over the said diaphragm. Adjustably secured in the cap plate 46 is a sleeve 48 in which is screwed a stop 49. Within the sleeve 48 and resting on the central hub portion of the diaphargm 43, is a tubular vertically slidable space piece 50, the upper end of which is adapted to engage a shoulder formed on the stop 49. By properly adjusting the sleeve 48 and the stop 49 the diaphragm 43 will be stopped at the desired point in its upward movement. The sleeve 48 and the stop 49 are locked in their adjusted positions by suitable lock nuts, as shown in the drawings. It is manifest, therefore, that the upper and lower positions of the diaphragm 43 may be very accurately determined. In the upper part of the supplemental body portion 40 is formed a train pipe reservoir chamber 51, said chamber being closed by a cap 52. Chamber 51 is at times in communication with the supplemental train pipe chamber 41, said communication being through an adjustable sleeve 53 the lower end of which is beveled to form a valve seat 54. In the train pipe chamber 41 is a valve 55 which is arranged to seat upwardly on the seat 54, the stem of said valve extending upwardly through the sleeve 53. Surrounding the said stem in the chamber 51 is a spring 56, said spring being compressed between the upper end of the sleeve 53 and a cap plate 57 which is adjustable on the stem of the valve 55. The spring 56 holds the valve 55 seated, and by adjusting the plate 57 the pressure of the spring 56 on said valve may be varied. Chamber 51 is connected to the train pipe reservoir through the passage 58, pipe connection 59, and pipe 60. The said chamber 51 is also in communication with chamber 47 through an open passage 61 so that train pipe reservoir pressure will always be registered in the chamber 47 and on top of the quick-release diaphram 43. In the supplemental train pipe chamber 41 a quick-release lever 62, is pivoted in block 63, its shorter arm 64 fitting in a slot in the stem 44 of the quick-release diaphragm. In its normal position the lower edge of the arm 64 engages the bottom wall of said slot, as shown clearly in dotted lines in Fig. 2. The longer arm 65 of said lever extends into a slot formed in the valve 55, the said slot being somewhat wider than the end of said lever, and in its normal position the said lever extends through said slot out of contact with the upper and lower walls thereof so that there is considerable lost motion between the lever and the valve, for a purpose that will be fully hereinafter set forth. In the lower part of the supplemental body portion 40 is formed a quick-release chamber 66, said chamber being closed by a cap 67 and being in communication with pipe 68 through a passage 69. The quick-release chamber 66 is at times in communication with the supplemental train pipe chamber through a vertically adjustable sleeve 70. The lower end of said sleeve forms a seat for an emergency reservoir release valve 71, said valve being yieldingly maintained on its seat by means of a spring 72 arranged within the quick-release chamber. The pressure of this spring on the valve may be regulated by means of a vertically adjustable screw 73. It is manifest that the position of the valve seat may be varied and that the pressure of the spring on the valve may be nicely adjusted. The upper end of the valve 71 is formed with a vertical stem 75 which is normally in engagement with the under side of the long arm 65 of the quick-release lever.

The emergency reservoir chamber 4 is formed with an outlet 76, which is closed normally by a downwardly seating check valve 77, said valve being yieldingly held to its seat by a spring 78. The spring and the check valve are inclosed with a cap 79 to which is connected the pipe 68. In this pipe 68 is arranged a maintaining valve 80, said valve being closed when it is desired to release the brakes gradually, and being opened when the triple valve is arranged for quick-release operations.

The operation of the service section of the valve for service braking and for graduated releases need not be described. The quick-release features of the triple valve operate as follows:

Upon an increase of train pipe pressure the train pipe air flows into chamber 41 through passage 42, lifting the diaphragm 43. This operation, through the lever 62, will depress and open emergency reservoir release valve 71 thereby permitting emergency reservoir air to flow past valve 77 through pipe 68, passage 69, past valve 71 into the supplemental train pipe chamber and thence to the train pipe through passage 42 and train pipe chamber 2. After the valve 71 is opened quick-release lever 62 will engage and move downwardly valve 55, thereby opening train pipe reservoir chamber to the supplemental train pipe chamber and permitting the train pipe reservoir to be charged through chamber 51, passage 58 and pipe 60. The pressure in chamber 51 will equalize with pressure in chamber 47 through passage 61, and when said pressures equalize with the pressure in chamber 41 the parts will return to their normal positions and valves 55 and 71 will close. The recharging of the emergency reservoir will take place through the triple valve, precisely as described in my hereinbefore mentioned Patent No. 1,183,103 and as further described in my hereinbefore mentioned application for patent.

For all service applications of the brakes, train pipe reservoir air will pass into the supplemental train pipe chamber 41 past valve 55 and thence into the train pipe chamber 2. Spring 56 lightly holds the valve 55 to its seat and there is sufficient lost motion between the valve head and the end of the lever 62 to permit said valve to be opened by the train pipe reservoir air without moving the said lever. It is to be noted that there is a lost motion between the lever and the valve head when the lever is moved downwardly, and also a lost motion between the valve head and the lever when the valve is moved downwardly by the service reservoir air during ordinary service applications of the brakes.

A differential of pressures will be maintained in chamber 47 and supplemental train pipe chamber 41, due to the tension of the spring 72 tending to seat valve 71 and return the lever 62 to its normal position. When the pressure in chamber 47, plus the tension of spring 72, is sufficient to overcome the pressure in chamber 41, the quick-release diaphragm 43 will be returned to its normal position. By varying the tension of spring 72 the desired differential of pressures may be maintained. If desired a spring 81, shown in Fig. 3, may be inserted in the space piece 50 and arranged to exert a downward pressure on the diaphragm 43. This spring will also assist in maintaining a differential of pressures in chambers 41 and 47. In some instances it may be more desirable to employ both springs 72 and 81 for the purpose of maintaining the predetermined differential of pressures. By employing the two springs the tension of spring 72 may be much lighter and a better adjustment of the parts may be secured.

The construction and operation of the parts contained in section B of the triple valve are as follows:

The supplemental train pipe chamber of section A of the triple is in direct communication with the emergency train pipe chamber 82 of section B of the triple valve through pipe 60. Extending upwardly through the bottom wall of the section B of the triple valve, and into the chamber 82, is an open-ended tubular post 84 having a train pipe reservoir valve 85 formed at its upper end, its lower end being in direct communication with the train pipe reservoir through pipe 83. Sliding on this post is a sleeve 86 depending from a central tubular hub 87 of the emergency brake cylinder diaphragm 88. The hub 87 is apertured centrally and formed with the annular valve seat 89 which is adapted to seat upon the valve 85 formed on the upper end of the tubular post 84. A downwardly seating check valve 90 normally closes the aperture through the hub 87, and said valve is provided with a small leak port 91, for a purpose which will hereinafter appear. The hub 87 is formed with a tubular part 92 somewhat larger in diameter than the sleeve 86, and within said tubular part is formed an annular chamber 93 which is in communication with the emergency train pipe chamber 82 through ports 94. Slidably mounted on the tubular part 92 of the hub 87 is a ring-like hub 95 of the emergency train pipe diaphragm 96, the said diaphragm forming the upper wall of the emergency train pipe chamber 82. The diaphragm 88 forms the lower wall of an emergency brake cylinder chamber 97. The diaphragms 88 and 96 are spaced apart around their outer edges by means of a spacing ring 98, to form the quick-action chamber 99. The quick-action reservoir F is in communication with the quick-action chamber through pipe 100, passage 101, and the ports formed in the restriction screw 102. The train pipe emergency diaphragm 96 has an independent movement on the hub 92, under the influence of the pressure in the quick-action chamber 99 when said pressure exceeds the pressure in the emergency train pipe chamber 82, as will be more fully hereinafter described. This latter chamber is in constant communication with the quick-action chamber through the passage 103, and the ports through the restriction screw 102. The diaphragms 88 and 96 form a movable abutment between the two chambers 82 and 97.

In the upper wall of the emergency brake cylinder chamber 97 is secured a vertically adjustable sleeve 104, on the upper end of which is formed a valve seat adapted to receive a downwardly seating emergency reservoir valve 105. The upper portion of this valve is inclosed by a cap 106, a spring 107 confined between said cap and the upper surface of the valve serving to yieldingly hold said valve to its seat. The cap 106 forms a chamber which is in communication with the outlet passage 108, and said passage is in communication with the emergency reservoir through pipe 109. The valve 105 normally prevents emergency reservoir air passing to the emergency brake cylinder chamber 97. In the upper wall of the emergency brake cylinder chamber 97, at the opposite side thereof from valve 105, is secured a vertically adjustable sleeve 110, on the lower end of which is formed a valve seat adapted to receive an upwardly seating valve 111, the head of said valve being within the emergency brake cylinder chamber. Valve 111 is formed with an upwardly extending stem, and surrounding said stem is a spring 112 which is confined between the upper end of the sleeve 110 and a vertically adjustable disk 113. By varying the position of the said disk the tension of the spring 112 may be varied to vary the pressure of the valve 111 on its seat. The upper end of the valve 111 is inclosed within a cap 114, said cap forming a chamber 115 which is in communication with the brake cylinder through passage 116 and connected pipes 117 and 117ª, the latter pipe being connected to equalizing chamber 25 through pipe connection 25ᵇ. As hereinbefore pointed out, chamber 25 is connected with the service brake cylinder D through passages 25ª and 25ᶜ.

In the upper wall of the emergency brake cylinder chamber 97, at one side of the center thereof, is secured a depending fulcrum block 118. Pivoted on this block, within the emergency brake cylinder chamber, is a substantially horizontal lever 119 having a shorter arm 120, and a longer arm 121. The shorter arm 120 is adapted to engage the lower end of the emergency reservoir valve 105; and the end of the longer arm of said lever is adapted to extend through a slot in the head of valve 111, the lower edge of the lever bearing normally on the lower wall of said slot, as shown clearly in Figs. 4 and 5. Secured to the center of an upwardly extending arch portion 122 of the emergency brake cylinder diaphragm 88, is a live or floating fulcrum block 123, said block being pivotally connected to the longer arm of the lever 119. It is manifest that the reciprocation of the diaphragm 88 will move the valves 105 and 111 in opposite directions.

Threaded through the lower wall of the emergency train pipe chamber 82 is an adjustable sleeve 124 whose upper end forms a downwardly tapered seat for an emergency train pipe exhaust valve 125, the head of said valve being within the chamber 82. The stem 126 of said valve is surrounded by a spring 127, said spring being confined between a rigid ring 128 carried by the sleeve 124 and an adjustable disk 129 carried by the valve stem. By varying the position of the disk 129 the degree of pressure holding the valve 125 to its seat may be varied. The valve stem and spring are inclosed within a cap 130 which is formed with ports 131 connecting the interior thereof with the atmosphere. On a fulcrum block 132 within the emergency train pipe chamber 82 is mounted an emergency lever 133, the outer end of which extends through a slot in the head of the valve 125. As shown clearly in Fig. 4, the upper wall of said slot bears on the upper edge of said lever. The inner end of the emergency lever is forked, as shown clearly in Fig. 7, and extends around the tubular portion 92 of the diaphragm 88 directly below the hub 95 of the diaphragm 96, the ends of the fork being formed with upwardly extending lugs 134, the said lugs being directly below the hub 95 and in position to be engaged thereby when said diaphragm is depressed, as shown in dotted lines in Fig. 6. Secured to the tubular extension 92 of the diaphragm 88 is a ring valve 135, said valve being locked in its adjusted position by means of a locking ring 136. In the under side of the hub 95 of diaphragm 96 is formed an upwardly tapered valve seat 137 which is adapted to receive the valve 135 as shown clearly in Fig. 6, when the diaphragm 96 moves downwardly independently of the diaphragm 88. Because of the sliding fit between the hub 95 and the tubular extension 92 of the diaphragm 88, there will be a leakage of air between said parts. When the pressure in the quick-action chamber 99 exceeds the pressure in the emergency train pipe chamber 82 it is desirable to prevent leakage around the tubular portion 92, and the valve 135 will seal the parts and prevent such leakage when the diaphragm 96 moves downwardly away from the diaphragm 88. In this position of the parts the only communication between the emergency diaphragm chamber 99 and the emergency train pipe chamber 82 is through the ports of the restriction screw 102 and the passage 103. This is desirable in order that the rate of leakage between said two chambers may be accurately determined and maintained at the predetermined rate. It is to be noted that the diaphragm 96 has a downward movement independently of the diaphragm 88, and that during said independent downward movement the hub 95 of the diaphragm 96 will engage the lugs 134 on the fork of the emergency lever 133 and will move said lever on its pivot sufficiently to open the emergency train pipe exhaust valve 125. At the end of the said independent downward movement of the diaphragm 96 the valve seat 137 will have reached the valve 135 and seated thereon.

As shown in the drawings the emergency change-over section of the tripple valve is made up of the lower body section $B^1$, the upper body section $B^2$, and the intermediate ring section 98 hereinbefore described, said sections being suitably secured together by means of bolts 138 or otherwise.

The auxiliary brake cylinder $D^1$ is connected to the pipe 117 by a branch pipe 139, this pipe being connected by pipe 140 to the service brake cylinder D. In pipe 139 is arranged a valve 141, and in pipe 140 is arranged a valve 142. The check valve G in pipe $117^a$ may be of any suitable construction and is arranged to prevent the passage of brake cylinder air from chamber 25 through pipe $117^a$ to cylinder $D^1$, but permits air to flow from pipe 117 through pipe $117^a$ to chamber 25. By providing the auxiliary brake cylinder $D^1$ and the pipe connections and valves described, it is manifest that the said auxiliary cylinder may be used, together with brake cylinder D, for service braking and emergency braking, by opening valves 142 and 141. By closing valve 142 and opening valve 141 the auxiliary brake cylinder may be used only for emergency braking. By closing valves 141 and 142 the auxiliary brake cylinder will be entirely disconnected from the braking apparatus. This is desirable where only light braking is necessary. It is clear, therefore, that by means of the auxiliary brake cylinder the apparatus is adapted for light braking suitable for empty or unloaded cars, but may be quickly changed to adapt it for heavy braking for use on loaded cars. It is also well adapted for use in passenger service where it is desirable to have heavy braking for emergency occasions and light braking for ordinary service stops.

The operation of the emergency change-over section of the apparatus will be clear from the foregoing, but may be briefly restated as follows:

In originally charging the apparatus train pipe air flows through pipe 60, chamber 82, tubular post 84, to the train pipe reservoir. The pressure in chamber 82 raises the diaphragm 96 and also the diaphragm 88. Air passes around check valve 91 into chamber 97, the pressures in chambers 82 and 97 equalizing. The exhaust valve 125 is held to its seat by spring 127. From chamber 82 air flows through passage 103 and the ports in the restriction screw 102, into quick-action chamber 99 and through passage 101 and pipe 100 into quick-action reservoir F.

Spring 107 and emergency reservoir air pressure on top of valve 105 will be sufficient to prevent the charging of the emergency reservoir through emergency brake cylinder chamber 97 past valve 105.

Upon a sudden reduction of train pipe pressure for the purpose of securing an emergency application of the brakes, pressure in chamber 82 is correspondingly reduced and the superior pressure in quick-action chamber 99 will immediately move the diaphragm 96 downwardly independently of the diaphragm 88. This latter diaphragm also will be moved downwardly by the superior pressure in chamber 97, bringing the valve seat 89 to the valve 85 thereby sealing the train pipe reservoir from the chamber 82. The downward movement of the diaphragm 88 will swing the lever 119 on its fixed pivot and open valves 105 and 111. This will permit emergency reservoir air to flow through pipe 109, passage 108, emergency brake cylinder chamber 97, chamber 115, passage 116 to the brake cylinder, through pipe 117. In order to secure the operation of the emergency section of the triple the reduction in pressure in chamber 82 must be more rapid than air can flow from the train pipe reservoir past valve 85 through passages 94 into said chamber 82. The size of the port around valve 85 is so determined that this may be accomplished by the proper reduction in train pipe pressure. If the pressure in the train pipe reservoir is superior to the pressure in chamber 97 valve 90 will be unseated and train pipe reservoir air will flow into said chamber 97 and thence to the brake cylinder. If the pressure in chamber 97 is superior to the train pipe reservoir pressure at the time of an emergency application of the brakes, valve 90 will be held to its seat and air will flow slowly through the small equalizing port 91 into the train pipe reservoir until there is an equalization of these pressures. These pressure conditions are likely to occur only where there is an emergency application of the brakes following a depletion of the train pipe reservoir pressure by means of service applications of the brakes. It is manifest that if the apparatus be operated for an emergency application of the brakes with the train pipe reservoir fully charged to the normal running pressure, the said train pipe reservoir pressure will be superior to the equalized brake cylinder and emergency reservoir pressures, and the train pipe reservoir air would flow past valve 90 into chamber 97 until there was an equalization of pressures.

The downward movement of the diaphragm 96 will bring the hub 95 thereof into engagement with the lugs 134 on the yoke of the release lever 133, and swing said lever on its pivot to open the train pipe emergency exhaust valve 125. This results in venting the chamber 82 to atmosphere through ports 131. The valve 135 will engage seat 137 and seal the connection between the hub 95 and the tubular part 92 of diaphragm 88 and prevent leakage therethrough. The pressures in the quick-action reservoir F and the quick-action chamber 99 will be slowly equalized with the pressure in chamber 82 through the ports in the restriction screw 102 and the passage 103. When these pressures have equalized valve 125 will be seated by its spring 127, and diaphragm 96 will be moved upwardly into engagement with the diaphragm 88 as shown in Fig. 5. The chamber 82 may be then recharged with train pipe air and the abutment formed by the diaphragms 88 and 96 moved upwardly to its normal position and valves 105 and 111 closed, and this increase in train pipe pressure will recharge the train pipe reservoir and the emergency reservoir.

What I claim is:

1. A triple valve for air brakes comprising means operating upon a slow reduction of train pipe pressure to admit train pipe air to the brake cylinder for a service application of the brakes, an emergency train pipe chamber, an emergency brake cylinder chamber, a movable abutment between said chambers, and valves controlling communication from the emergency reservoir to the emergency brake cylinder chamber and from said chamber to the brake cylinder and from the emergency train pipe chamber to atmosphere, all of said valves being operated by the movable abutment upon a sudden reduction in train pipe pressure.

2. A triple valve for air brakes comprising means operating upon a slow reduction of train pipe pressure to admit train pipe air to the brake cylinder for a service application of the brakes, an emergency train pipe chamber, an emergency brake cylinder chamber, a movable abutment between said chambers, a train pipe reservoir connection normally in open communication with the emergency train pipe chamber, means controlled by the movable abutment for sealing said connection from the emergency train pipe chamber and placing it in communication with the emergency brake cylinder, means in the emergency brake cylinder chamber and operating upon a sudden reduction of train pipe pressure to open communication between the emergency reservoir and the brake cylinder through said chamber for an emergency application of the brakes, and means operated by the abutment to vent the emergency train pipe chamber to atmosphere.

3. A triple valve comprising means operating upon a slow reduction of train pipe pressure to admit air to the brake cylinder for a service application of the brakes, an emergency train pipe chamber, an emergency brake cylinder chamber, a movable abutment between said chambers, and means operated by a sudden reduction of train pipe pressure to vent the emergency train pipe chamber to atmosphere and to place the emergency reservoir in communication with the brake cylinder through the emergency brake cylinder chamber.

4. A triple valve comprising means operating upon a reduction of train pipe pressure to admit air to the brake cylinder for a service application of the brakes, and upon an increase of train pipe pressure to release air from the brake cylinder, an emergency train pipe chamber, an emergency brake cylinder chamber, a movable abutment between said chambers, a train pipe reservoir connection normally in open communication with the emergency train pipe chamber, and means adapted to be operated by said movable abutment upon a sudden reduction in train pipe pressure to vent the emergency train pipe chamber to atmosphere to open communication between the emergency reservoir and brake cylinder through the emergency brake cylinder chamber and to seal the train pipe reservoir from the emergency train pipe chamber and place it in communication with the emergency brake cylinder chamber.

5. A triple valve comprising means operating upon a slow reduction of train pipe pressure to admit air to the brake cylinder for a service application of the brakes, an emergency train pipe chamber, an emergency brake cylinder chamber, a movable abutment between said chambers formed of two independent diaphragms having a quick-action chamber between them, one of said diaphragms forming one wall of the emergency train pipe chamber and the other forming one wall of the emergency brake cylinder chamber, a quick-action reservoir connected to the quick-action chamber, a train pipe reservoir connection normally in communication with the emergency train pipe chamber, means operated by the movable abutment to open communication between the emergency reservoir and the brake cylinder upon a sudden reduction in train pipe pressure, means operable by the diaphragm forming one wall of the emergency train pipe chamber for venting the said emergency train pipe chamber to atmosphere, and means whereby upon a sudden reduction of train pipe pressure the train pipe reservoir connection will be sealed from the emergency train pipe chamber and placed in communication with the emergency brake cylinder chamber.

6. In an air brake apparatus, a valve device comprising a movable abutment formed of two independently movable diaphragms having a quick-action chamber between them, means operable by said abutment upon a sudden reduction in train pipe pressure to place the emergency reservoir in communication with the brake cylinder, and means whereby the pressure in the quick-action chamber between said diaphragms will move one of them to vent the train-pipe to atmosphere.

7. In an air brake apparatus, a valve device comprising a movable abutment formed of two independently movable diaphragms having a quick-action chamber between them, means operable by said abutment upon a sudden reduction in train pipe pressure to place the emergency reservoir in communication with the brake cylinder, means whereby the pressure in the quick-action chamber between said diaphragms will move one of them to vent the train pipe to atmosphere, a quick-action reservoir connected to said quick-action chamber, and means whereby the pressure in the quick-action chamber will slowly equalize with the reduced train pipe pressure.

8. An air brake apparatus comprising a valve device formed with an emergency train pipe chamber, an emergency brake cylinder chamber, a movable abutment between said chambers formed of two independently movable diaphragms having a quick-action chamber between them, a quick-action reservoir connected to the quick-action chamber, a train pipe reservoir connected to the emergency train pipe chamber, means operable by the movable abutment upon a sudden reduction of train pipe pressure to place the emergency reservoir in communication with the brake cylinder and to seal the train pipe reservoir from the emergency train pipe chamber and place it in communication with the emergency brake cylinder chamber, means whereby the pressure in the quick-action chamber will move one of said diaphragms independently of the other to vent the emergency train pipe chamber to atmosphere, and means permitting a slow equalization of pressures in the quick-action chamber and the emergency train pipe chamber after a reduction in the train pipe pressure.

9. An air brake apparatus comprising a valve device formed with an emergency train pipe chamber, an emergency brake cylinder chamber, a movable abutment between said chambers formed of two independently movable diaphragms having a quick-action chamber between them, a quick-action reservoir connected to the quick-action chamber, a train pipe reservoir connected to the emergency train pipe chamber, means operable by the movable abutment upon a sudden reduction of train pipe pressure to place the emergency reservoir in communication with the brake cylinder and to seal the train pipe reservoir from the emergency train pipe chamber, a check valve to prevent a sudden flow of air from the emergency brake cylinder chamber to the train pipe reservoir while permitting a free flow of air from the reservoir to said chamber, said valve being formed with a leak port to provide a slow equalization of pressures in the emergency brake cylinder chamber and train pipe reservoir when the superior pressure is in the emergency brake cylinder chamber, means whereby the pressure in the quick-action chamber will move one of said diaphragms independently of the other to vent the emergency train pipe chamber to atmosphere, and means permitting a slow equalization of pressures in the quick-action chamber and the emergency train pipe chamber after a reduction in the train pipe pressure.

10. A triple valve emergency section formed with an emergency train pipe chamber, an emergency brake cylinder chamber, a movable abutment between said chambers and formed of two independently movable diaphragms having a quick-action chamber between them, an emergency reservoir valve, a brake cylinder check valve, a lever connected to said valves and to the movable abutment, an emergency train pipe chamber exhaust valve, and a lever adapted to be operated by one of the diaphragms of the movable abutment to open said exhaust valve upon a sudden reduction in train pipe pressure.

11. A triple valve emergency section formed with an emergency train pipe chamber, an emergency brake cylinder chamber, a movable abutment between said chambers formed of a pair of independently movable diaphragms having a quick-action chamber between them, a vertically adjustable tubular post forming a train pipe reservoir connection and opening at its inner end into the emergency train pipe chamber, means whereby the movement of the abutment will seal the said tubular post from the emergency train pipe chamber and place it in communication with the emergency brake cylinder chamber, an emergency train pipe exhaust valve, means whereby the pressure in the quick-action chamber will move one of the diaphragms independently of the other to open said exhaust valve, means to seal the sliding connection between the two diaphragms, means to permit a slow equalization of pressures between the quick-action chamber and the emergency train pipe chamber, and means operable by the movable abutment to open communication between the emergency reservoir and the brake cylinder.

12. A valve device, comprising a movable abutment formed of two independently movable diaphragms having a quick-action chamber between them, means operable by said abutment upon a sudden reduction in train pipe pressure to place the emergency reservoir in communication with the brake cylinder, and means whereby the pressure in the quick-action chamber between said diaphragms will move one of them to vent the train pipe to atmosphere.

13. In an air brake apparatus, a valve device comprising a movable abutment, a pair of valves controlling communication between the emergency reservoir and the brake cylinder, a lever operable by said movable diaphragm, and adapted to open said valves upon a sudden reduction in train pipe pressure.

14. In an air brake apparatus, a valve device comprising a movable abutment subject to train pipe pressure, a lever connected to said abutment, a pair of valves adapted to be operated by said lever and controlling communication between the emergency reservoir and the brake cylinder, emergency reservoir air holding one of said valves to its seat and brake cylinder pressure tending to force the other valve from its seat, and means whereby upon a sudden reduction in train pipe pressure the said abutment will be moved to open said valves.

15. In an air brake apparatus, a valve device comprising a movable abutment subject on both sides to train pipe pressure, a lever connected to said abutment, a pair of valves adapted to be moved in opposite directions and controlling communication between the emergency reservoir and the brake cylinder, one of said valves being arranged to be held closed by emergency reservoir pressure, and means whereby upon a sudden reduction in train pipe pressure said abutment will be moved and said valves opened.

16. An air brake apparatus, comprising a train pipe, an emergency reservoir, a brake cylinder, a triple valve, a movable abutment in said triple valve subject to train pipe pressure on both of its sides, and a pair of valves connected to and operated by said abutment to control communication between the emergency reservoir and the brake cylinder, said abutment being adapted to be operated only by a sudden reduction in train pipe pressure.

17. An air brake apparatus, comprising a train pipe, an emergency reservoir, a brake cylinder, a triple valve, a movable abutment in said triple valve subject to train pipe pressure on both of its sides, a pair of valves connected to and operated by said abutment to control communication between the emergency reservoir and the brake cylinder, said abutment being adapted to be operated only by a sudden reduction in train pipe pressure, and means to prevent the movement of said abutment by a slow reduction in train pipe pressure.

18. In an air brake apparatus, a valve device comprising a pair of valves controlling communication between the emergency reservoir and the brake cylinder, a movable abutment responding only to a sudden reduction in train pipe pressure, and means connecting the said pair of valves to said abutment and adapted to open said valves for an emergency application of the brakes.

19. In an air brake apparatus a valve device comprising a movable abutment formed of two independently movable diaphragms having a quick-action chamber between them and separating an emergency brake cylinder chamber from an emergency train pipe chamber, means operable by said abutment upon a sudden reduction in train pipe pressure to place an emergency reservoir in communication with the brake cylinder, one of said abutments moving independently to vent the emergency train pipe chamber to atmosphere by the pressure in the quick-action chamber, means being provided whereby the pressure in the quick-action chamber will slowly equalize with the reduced pressure in the emergency train pipe chamber.

20. An air brake apparatus comprising a train pipe, an emergency reservoir, a brake cylinder, a train pipe reservoir, a triple valve, a movable abutment in said triple valve formed of two independently movable diaphragms having a quick-action chamber between them, a quick-action reservoir connected to said chamber, an emergency train pipe chamber being formed below the abutment and an emergency brake cylinder chamber being formed above the abutment, means operated by the abutment to control communication between the emergency reservoir and the brake cylinder and between the emergency train pipe chamber and the atmosphere, and means being provided whereby upon a slow reduction of train pipe pressure the movable abutment will not be affected, but whereby upon a sudden reduction in train pipe pressure the train pipe reservoir will be sealed from the train pipe chamber and said chamber will be vented to atmosphere and the emergency reservoir will be placed in communication with the brake cylinder.

21. An air brake apparatus as defined in claim 22 and embodying a movable abutment formed of two independently movable diaphragms having a quick-action chamber between them, said chamber being connected by a restricted port with an emergency train pipe chamber on one side of the said movable abutment, whereby the pressure in the quick-action chamber will move one of said abutments and the pressure in said chamber will slowly equalize with the pressure in the emergency train pipe chamber through said restricted port.

22. In an air brake apparatus, a valve device comprising a movable abutment formed of two independently operable diaphragms and means operable by said diaphragms upon a sudden reduction in train pipe pressure to vent the train pipe to atmosphere and place an emergency reservoir in communication with the brake cylinder for an emergency application of the brakes.

23. An air brake apparatus comprising means operating upon a slow reduction of train pipe pressure to admit train pipe air to the brake cylinder for a service application of the brakes, and a valve device comprising a movable abutment formed of two independently operable diaphragms and means operable by said diaphragms upon a sudden reduction in train pipe pressure to vent the train pipe to atmosphere and place an emergency reservoir in communication with the brake cylinder for an emergency application of the brakes.

24. An air brake apparatus as defined in claim 22, provided with means whereby the train pipe reservoir air may pass into the emergency brake cylinder chamber when pressure in said reservoir exceeds the equalized pressure in the emergency brake cylinder chamber and will be permitted to leak slowly from the said emergency brake cylinder chamber into the train pipe chamber when the dominating pressure is in said chamber.

In testimony whereof I hereunto affix my signature.

SPENCER G. NEAL.